United States Patent
Trimberger et al.

(10) Patent No.: US 8,166,366 B1
(45) Date of Patent: Apr. 24, 2012

(54) PARTIAL CONFIGURATION OF PROGRAMMABLE CIRCUITRY WITH VALIDATION

(75) Inventors: Stephen M. Trimberger, San Jose, CA (US); Brendan K. Bridgford, Vienna, VA (US)

(73) Assignee: Xilinx, Inc., San Jose, CA (US)

( * ) Notice: Subject to any disclaimer, the term of this patent is extended or adjusted under 35 U.S.C. 154(b) by 1219 days.

(21) Appl. No.: 11/975,961

(22) Filed: Oct. 22, 2007

(51) Int. Cl.
*H03M 13/15* (2006.01)
*H03M 13/01* (2006.01)

(52) U.S. Cl. .......................... 714/758; 714/725

(58) Field of Classification Search .............. None
See application file for complete search history.

(56) References Cited

U.S. PATENT DOCUMENTS

| | | | |
|---|---|---|---|
| 7,019,558 B1 * | 3/2006 | Jacobson et al. | 326/38 |
| 7,795,909 B1 * | 9/2010 | Daxer et al. | 326/39 |
| 2005/0242834 A1 * | 11/2005 | Vadi et al. | 326/37 |
| 2006/0209584 A1 * | 9/2006 | Devadas et al. | 365/52 |

* cited by examiner

*Primary Examiner* — Cynthia Britt
*Assistant Examiner* — Dipakkumar Gandhi
(74) *Attorney, Agent, or Firm* — W. Eric Webostad (57) ABSTRACT

Partial configuration of programmable circuitry with validation for an integrated circuit is described. An integrated circuit with programmable circuitry is obtained. The programmable circuitry is configured with a first bitstream in a non-dynamic mode of operation, after which the integrated circuit includes a configuration controller coupled to a buffer, an internal configuration access port, and an error checker. A portion of a second bitstream is loaded into the buffer for a dynamic partial configuration mode of operation. The portion of the second bitstream loaded into the buffer is validated with the error checker as being acceptable, after which the portion of the second bitstream is instantiated in the programmable circuitry via the internal configuration access port.

20 Claims, 5 Drawing Sheets

PARTIAL CONFIGURATION OF PROGRAMMABLE CIRCUITRY WITH VALIDATION

FIELD OF THE INVENTION

The invention relates to integrated circuit devices (ICs). More particularly, the invention relates to a partial configuration of programmable logic with validation for an IC.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

An FPGA may be configured when in a shut down mode, which halts operation of a user design instantiated in programmable logic of such FPGA. In this type of configuration, configuration bits may be checked, such as with a cyclic redundancy check ("CRC") or an error-correcting code ("ECC") validation, prior to be loaded in configuration memory.

In contrast to normal, "static" or "non-dynamic," configuration, there is configuring or reconfiguring a user design while continuing operation of FPGA apart from such configuring or reconfiguring which is conventionally known as "dynamic partial configuration" or "dynamic partial reconfiguration." For purposes of clarity, the phrase "dynamic partial configuration" is used herein to include either or both configuring or reconfiguring programmable logic dynamically. Heretofore, dynamic partial configuration could not be done with validation prior to such configuring. This meant that for dynamic partial configuration, validation could only be done by a readback of configuration bits already loaded into configuration memory. However, a bit which is in error and which is loaded may have adverse affects, such as for example one or more of: improper functioning of a user design; high current conditions; or permanent damage to an FPGA.

Accordingly, it would be desirable and useful to provide means to validate configuration bits prior to loading into configuration memory for dynamic partial configuration.

SUMMARY OF THE INVENTION

One or more aspects generally relate to integrated circuit devices (ICs) and, more particularly, to a partial configuration of programmable logic with validation for an IC.

An aspect relates generally to a method for programming programmable logic. An integrated circuit with programmable logic is obtained. The programmable logic is configured with a first bitstream in a non-dynamic mode of operation, after which the integrated circuit includes a configuration controller coupled to a buffer, an internal configuration access port, and an error checker. A portion of a second bitstream is loaded into the buffer for a dynamic partial configuration mode of operation. The portion of the second bitstream loaded into the buffer is validated with the error checker as being acceptable, after which the portion of the second bitstream is instantiated in the programmable logic via the internal configuration access port.

Another aspect relates generally to another method for programming programmable logic. The programmable logic is configured with a first bitstream using an external configuration access port to instantiate a configuration controller coupled to a buffer, an internal configuration access port, and an error checker. A portion of a second bitstream is loaded into the buffer. The portion of the second bitstream loaded in the buffer with the error checker is validated as being acceptable, after which the portion of the second bitstream is instantiated in the programmable logic via the internal configuration access port.

Yet another aspect of the invention relates generally to yet another method for programming programmable logic. The programmable logic is configured with a first bitstream using an external configuration access port to instantiate a configuration controller coupled to a buffer, an internal configuration access port, and an error checker. A first portion of a second bitstream is loaded into the buffer. The first portion is sent to a decryption module to decrypt the first portion. The first portion is decrypted with the decryption module to obtain first configuration information therefrom. The first configuration information includes first error detection information. First configuration data of the first configuration information is parsed from the first error detection information. Second error detection information is determined from the first configuration data. The first configuration data is validated by comparing the first error detection information and the second error detection information. Responsive to such validation indicating the first configuration data is acceptable, the first configuration data is instantiated in the programmable logic via the internal configuration access port.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
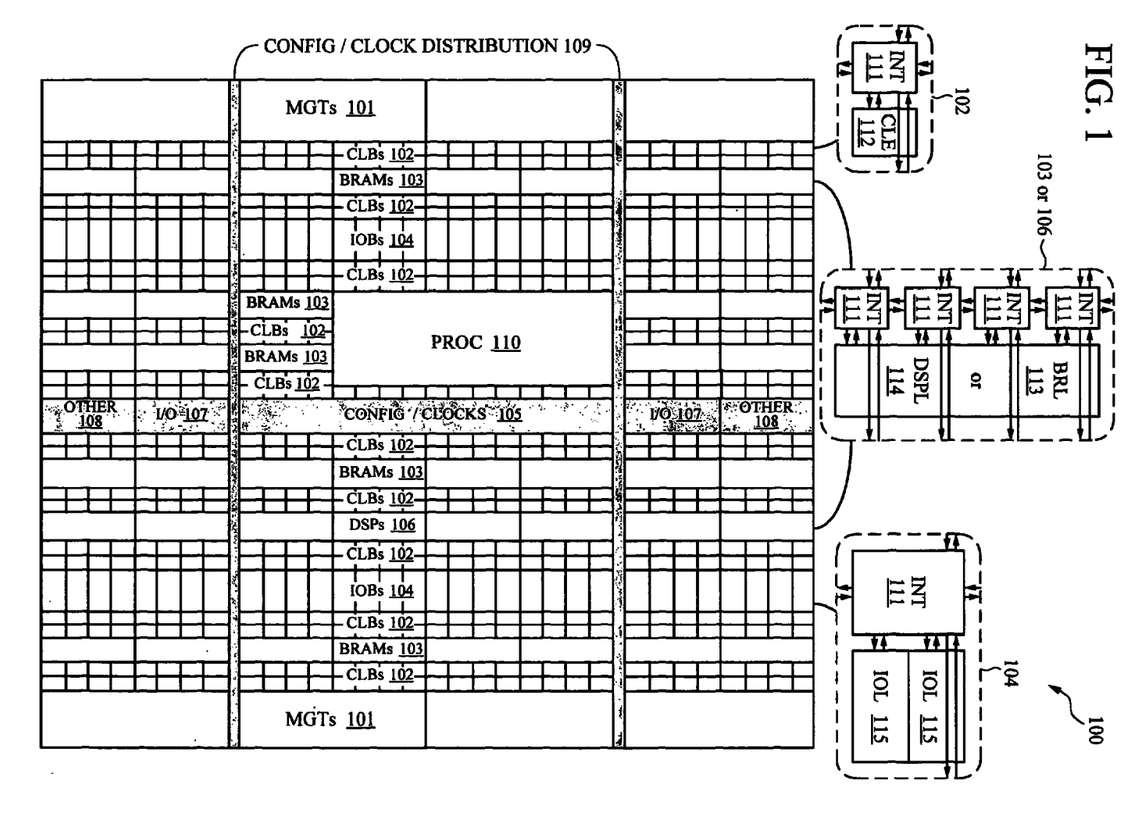
FIG. 1 is a simplified block diagram depicting an exemplary embodiment of a columnar Field Programmable Gate Array ("FPGA") architecture in which one or more aspects of the invention may be implemented.

As noted above, FPGAs are described, even though the following description is not limited to FPGAs but may include other types of PLDs. advanced FPGAs can include several different types of programmable logic blocks in the array. For example, FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die 120 in FIG. 1 is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
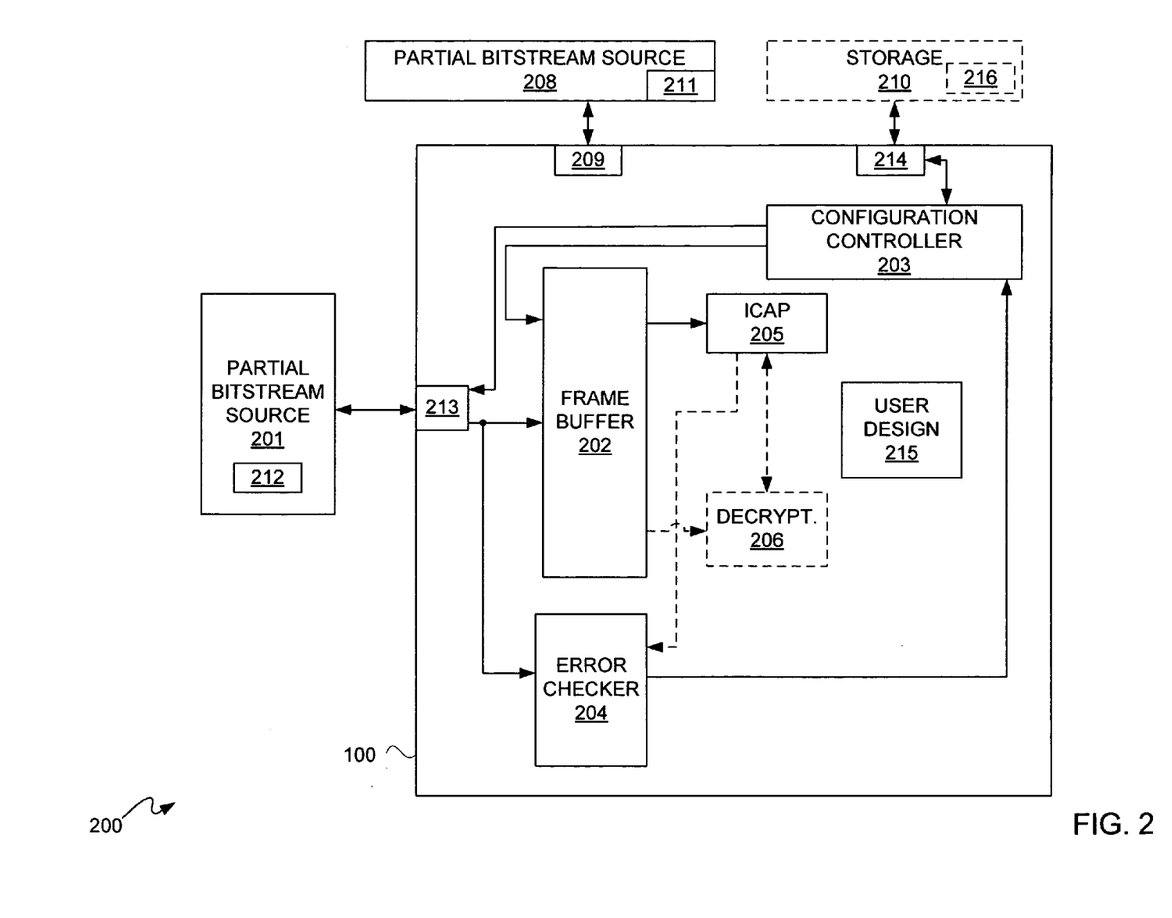
FIG. 2 is a block diagram depicting an exemplary embodiment of a programmable logic device system.

FIG. 2 is a block diagram depicting an exemplary embodiment of a PLD system 200. PLD system 200 includes FPGA 100, partial bitstream source 208, partial bitstream source 201, and storage 210.

Partial bitstream source 208 is coupled to a configuration interface 209 of FPGA 100. Configuration interface 209 is an external configuration port, such as a select map I/O port a JTAG port or a serial bitstream port. Partial bitstream source 208 may be a read-only memory having stored therein a partial bitstream 211 for initial configuration of FPGA 100. Partial bitstream 211 is described below in additional detail with reference to FPGA 100. Partial bitstream source 208 need not be a read-only memory, but for example may be a flash memory along with control logic for reading out partial bitstream 211 responsive to initialization of FPGA 100. Thus more generally, partial bitstream source 208 may be a non-volatile memory having a partial bitstream 211 stored therein.

As is known, for conventionally configuring FPGA 100 via configuration interface 209, validation of configuration information may be done prior to instantiation of that information in programmable logic of FPGA 100. Accordingly, this conventional validation is not described in unnecessary detail for purposes of clarity Partial bitstream 211 is loaded into configuration memory of FPGA 100 for instantiating a configuration controller 203 coupled to a frame buffer 202 and an error checker 204. Frame buffer 202 may be implemented using BRAM of FPGA 100. Even though the term frame buffer 202 is used herein, it should be appreciated that another type of grouping of configuration data may be used. However, conventionally configuration data is loaded into FPGA 100 one frame at a time, and so that example convention is described herein for purposes of clarity and not limitation. Accordingly, it should be appreciated that multiple frames may be loaded at a time or another type of grouping of configuration data may be loaded without departing from the scope of the description herein.

Partial bitstream 211 further is used to configure programmable logic for coupling frame buffer 202 to internal configuration access port ("ICAP") 205, as well as to configure programmable logic for providing interfaces 213 and 214. Interface 213 in part is for communicating with frame buffer 202 and error checker 204. Moreover interface 213 allows configuration controller 203 to communication with partial bitstream source 201.

Interface 214 is for communicating with configuration controller 203. Configuration interface 209 is a dedicated or hardwired configuration interface, such as a JTAG configuration, or parallel input or serial input configuration with an external port provided using programmable logic. Configuration controller 203 may be implemented as a Finite State Machine ("FSM"). Alternatively, configuration controller 203 may be implemented as a programmed microprocessor. Such a program microprocessor may be implemented in programmable logic, such as a MicroBlaze™ microprocessor or with use of an embedded microprocessor in FPGA 100.

Conventionally, error checker 204 is hardwired in FPGA 100. Alternatively, error checker 204 may be instantiated responsive to loading partial bitstream 211. Error checker 204 may be for any of a variety of known types of error checking, including CRC or ECC or a cryptographic hash, such as SHA-1 or SHA-512. For purposes of clarity by way of example and not limitation, it shall be assumed that ECC error checking is used, even though other known types of error checking may be used.

Conventionally, ICAP 205 and decryption module 206 are dedicated hardwired resources of FPGA 100. ICAP 205 is coupled to decryption module 206, as described in additional detail herein below. Decryption module 206 is optional.

Storage 210, which is optional, may be implemented as a random access memory, such as SRAM or DRAM. Thus, optionally, loading of partial bitstream 211 into configuration memory of FPGA 100 may optionally cause instantiation of a memory interface 214 for communicating with storage 210 by configuration controller 203. Likewise, instantiation of partial bitstream 211 may provide a memory interface 213 for communicating with partial bitstream source 201. Partial bitstream source 201 may be implemented using a random access memory, such as DRAM or SRAM for example. Alternatively, a nonvolatile memory or a communication bus may be used for communicating partial bitstream 212 a frame at a time to frame buffer 202. However, for purposes of clarity by way of example and not limitation, it shall be assumed that partial bitstream source 201 is a memory device having loaded therein partial bitstream 212.

It should be appreciated that partial bitstream 212 may include one or more partial bitstreams. A portion of partial bitstream 212 may be for instantiating a user design in programmable logic of FPGA 100. Another portion of partial bitstream 212 may be for partial reconfiguration of a portion of such user design 215. For purposes of clarity by way of example and not limitation, it shall be assumed that partial bitstream 212 is a plurality of partial bitstreams, where each such partial bitstream includes multiple frames of configuration data and where such frames of configuration data respectively include ECC bits.

Rather than an on-chip configuration controller 203, an off-chip configuration controller, namely external to FPGA 100, may be used. However, by having configuration controller 203 on-chip with respect to FPGA 100, errors that may be introduced by coupling an external source may be caught before instantiation.

It should be appreciated that once FPGA 100 is initialized, user design 215 may be instantiated in whole or in part from partial bitstream source 201 using partial bitstream 212. Alternatively, partial bitstream 211 may be a full configuration for initialization of FPGA 100 including configuration data for completely instantiating user design 215, and partial bitstream source 201 may have one or more partial bitstreams 212 for modification of user design 215 or for replacement with a different user design 215. In any of these embodiments, it should be appreciated that partial or full bitstream 211 may be conventionally validated, and one or more partial bitstreams 212 may be validated owing to prior instantiation of at least partial bitstream 211 to provide validation as described herein. Furthermore, it should be appreciated that instantiation of one or more partial bitstreams 212 may be done dynamically, namely while FPGA 100 is operating, which may include partial continued operation of user design 215.

Figure 3:
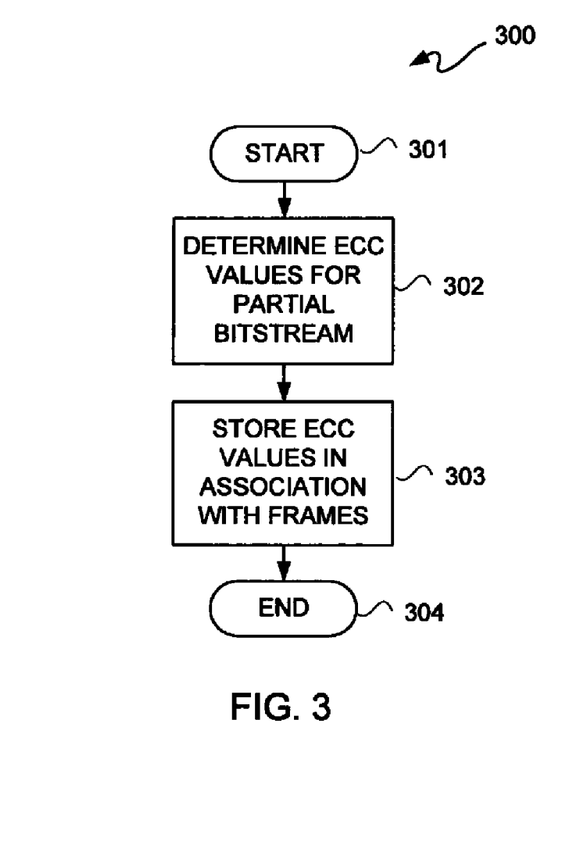
FIG. 3 is a flow diagram depicting an exemplary embodiment of an error-correcting code ("ECC") flow 300.

FIG. 3 is a flow diagram depicting an exemplary embodiment of an ECC flow 300. ECC flow 300 is initiated at 301. At 302, ECC values for a partial bitstream, such as a partial bitstream from one or more partial bitstreams 212, are determined. These ECC values may be determined for each frame or other grouping of configuration data. At 303, ECC values determined at 302 are stored in association with their respective frames or other grouping. This ECC calculation is done external to FPGA 100 for providing one or more partial bitstreams 212 of FIG. 2. At 304, ECC flow ends.

Figure 4:
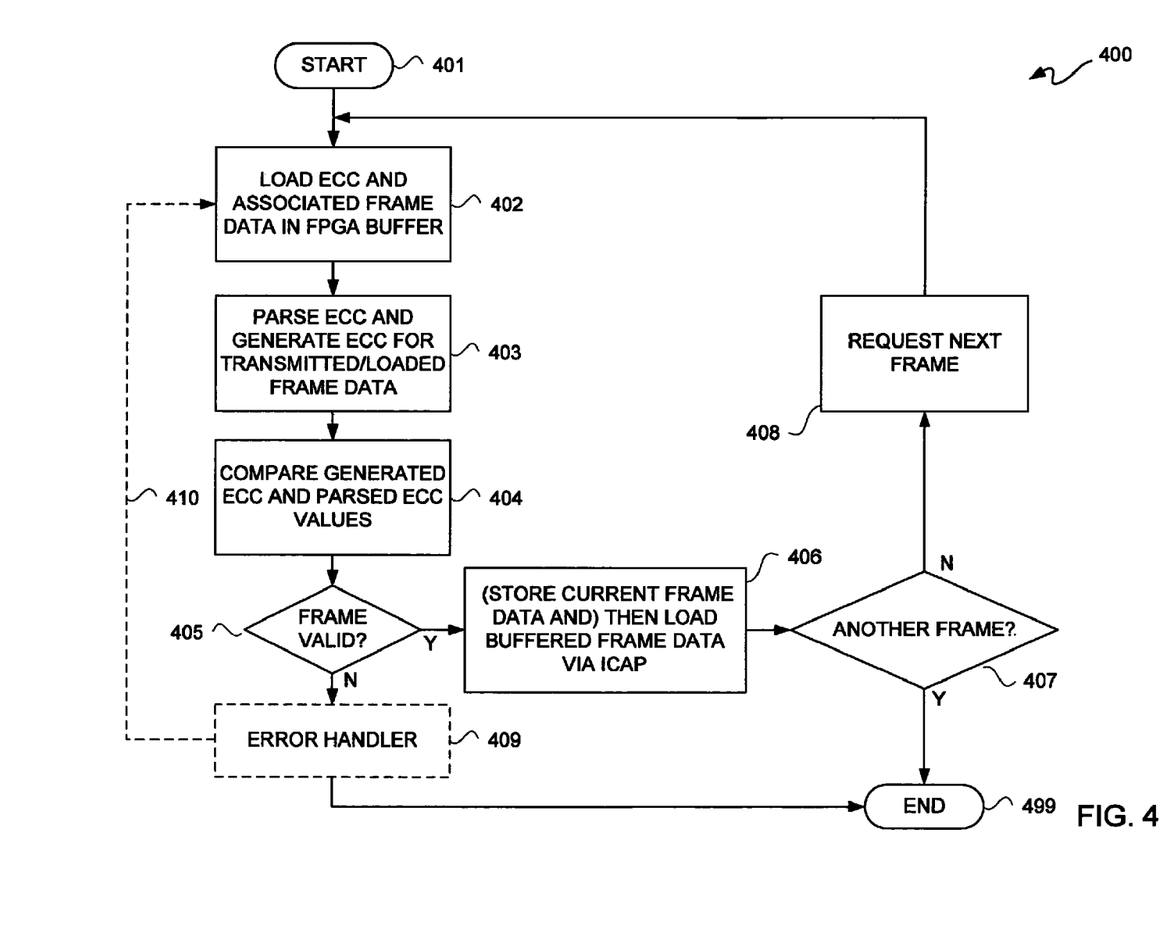
FIG. 4 is a flow diagram depicting an exemplary embodiment of a partial configuration flow.

FIG. 4 is a flow diagram depicting an exemplary embodiment of a partial configuration flow 400. Partial configuration flow 400 is initiated at 401. With simultaneous reference to FIGS. 2 and 4, partial configuration flow 400 is further described. At 402, a frame from a partial bitstream 212 of partial bitstream source 201 is loaded into frame buffer 202. In an embodiment, a frame data register input ("FDRI") frame is preceded by an FDRI packet or packets. In such FDRI packet or packets, the number of frames to be processed is identified as well as an initial address for writing of a first frame of a sequence of frames. Following the FDRI packet or packets, the body of configuration data, including ECC bits embedded in each frame, is sent. For purposes of clarity by way of example and not limitation, it is assumed that the FDRI packet or packets have already been sent or are included as part of start 401, as they are well known.

An initial frame to be written is loaded into frame buffer 202 and error checker 204 at 402. Of note, the ECC bits associated with the configuration data loaded into frame buffer 202 are included as part of a frame. The ECC bits may or may not be written to frame buffer 202 depending on the implementation.

In an implementation, a hardwired error checker 204 is used in which frame data is simultaneously written to frame buffer 202 and processed by error checker 204. While receiving frame data, error checker 204 calculates an ECC value for such frame data. As ECC bits may be stored for example at the end of each frame, by counting the number of bits, error checker 204 may know when frame data ends and ECC bits begin. Error checker 204 may thus be configured to parse the ECC bits from the frame data.

Error checker 204, having processed frame data for a frame, generates an ECC for the received frame data which may be compared with the parsed ECC obtained from the frame being processed. Error checker 204 may be configured to compare the generated ECC with the parsed ECC received to determine if a match exists. A signal may be provided from error checker 204 to configuration controller 203 indicating whether or not a match was obtained or not.

After 402, the ECC may be parsed from the frame data and an ECC may be generated from the frame data transmitted at 403. At 404, the generated ECC and the parsed ECC values may be compared. At 405, a determination may be made as to whether the frame data is valid for instantiation.

In another embodiment, error checker 204 may be implemented using programmable logic to provide the above-described capability. Furthermore, in another embodiment, a frame of frame data may be written to frame buffer 202. The frame written to frame buffer 202 as previously described may include both frame data and ECC bits associated with the frame data. After the write has completed to frame buffer 202, or during a write to frame buffer 202 for multi-ported memory, a read from frame buffer 202 may be used for generating an ECC from buffered frame data. Error checker 204 may be configured to parse ECC bits from buffered frame data in order to avoid having ECC bits included in the generation of an ECC value from frame data obtained from frame buffer 202. The ECC generated from frame data obtained from frame buffer 202 may be compared with the ECC parsed from the frame data buffered from frame buffer 202 to determine whether or not the buffered frame data is valid for instantiation. One or more flipped bits may occur within the ECC bits. Thus, even though frame data may be valid, if ECC values do not match because of a flipped bit or bits in the ECC values, the frame may be indicated as being invalid for instantiation. Alternatively, if there is only a single bit error, such single bit error may be corrected by error checker 204 using an ECC.

If at 405 it is determined that frame data is valid for instantiation in programmable logic of FPGA 100, then the frame data loaded in frame buffer 202 may be provided to ICAP 205 for writing to configuration memory of programmable logic starting at a specified address for an initial frame. If the frame data in frame buffer 202 is for a subsequent frame, ICAP 205 is configured to write such frame data at the next frame location in the sequence. Thus, at 406, the buffered frame data may be loaded via ICAP 205.

Optionally, as a precautionary measure, prior to loading the new frame data via ICAP 205 at 406, current frame data located at the location in which the buffered frame data is about to be written may be read out by ICAP 205 for passing to configuration controller 203 for passing to and temporary storing in storage 210 via memory interface 214. If the amount of configuration data of partial bitstream 212 is not too large, it may be stored in available BRAM in FPGA 100 for temporary storage as a backup in case a subsequent frame data is corrupted and cannot be corrected. In other words, optionally an existing set of configuration data may be temporarily stored in internal or external storage 210 in case there is a problem with partial bitstream 212.

Furthermore, depending on the modularity of design of partial bitstream 212 there may be logical backup points which are identified. Accordingly, the amount of temporary storage needed to do a backup due to a failed configuration data frame for example may be limited to configuration data between logical backup points. This reduces the amount of memory involved in providing backup temporary storage. Thus, with sufficient modularity of design, BRAM of FPGA 100 may be used to provide internal temporary storage to avoid external storage 210 and instantiation of interface 214.

At 407, after a buffered frame of configuration data has been loaded via ICAP 205, it is determined whether another frame of configuration data is to be obtained for processing as previously described. If another frame of configuration data is to be processed as determined at 407, then at 408 a request for a next frame of configuration data is provided to partial bitstream source 201. Steps 402 through 405 are repeated as previously described until no other frame is left to process. Partial configuration flow 400 may end at 499, or alternatively, another FDRI packet may be obtained for processing another frame or set of frames of configuration data.

Figure 5:
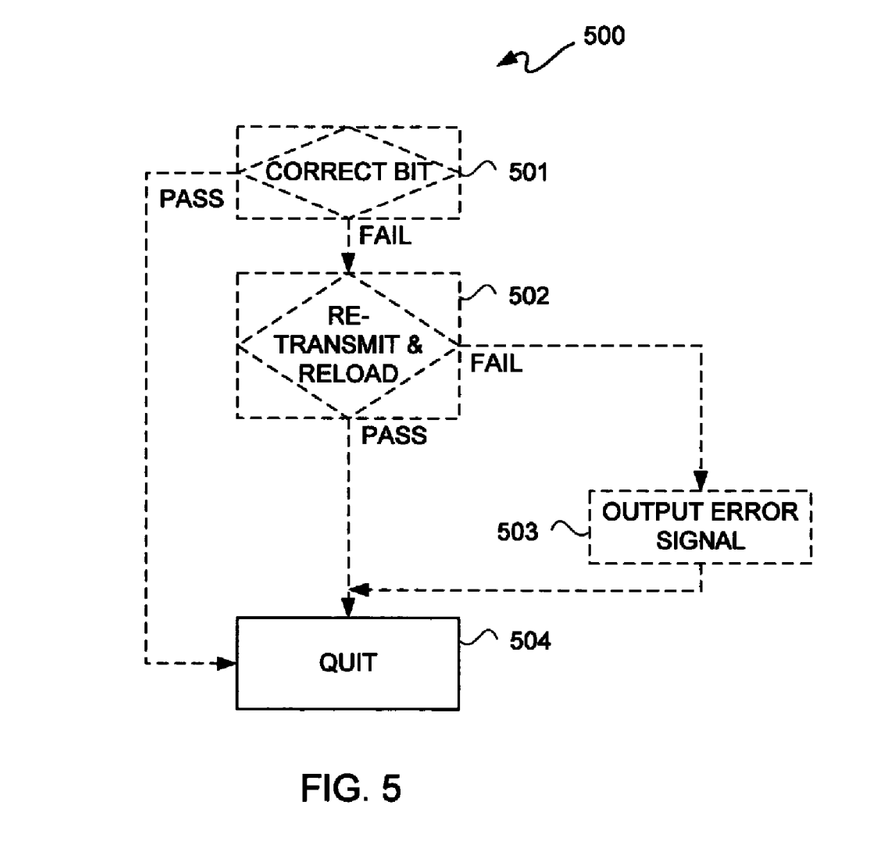
FIG. 5 is a flow diagram depicting an exemplary embodiment of an error handler flow.

If, however, at 405 it is determined that a frame of configuration data is not valid, then optionally at 409 an error handler may be invoked. FIG. 5 is a flow diagram depicting an exemplary embodiment of error handler flow 500. Error handler flow 500 may be used for error handler 409 of FIG. 4. Error handler flow 500 is described with simultaneous reference to FIGS. 4 and 5.

If an error is detected at 405, error handler flow 500 optionally at 501 may attempt to correct single bit errors. If the bit is corrected as determined at 501, then error handler flow may quit at 504. Single bit errors may be corrected using an ECC. If, however, the error cannot be corrected at 501, then a request may optionally be made at 502 to retransmit the frame for reloading. Such reload may be initiated again at 402 as indicated by dashed line 410. One or more retransmissions and reloads may be tried and if each of such fails as determined at 502, then at 503 optionally an error signal may be output and error handler flow 500 may thereafter quit at 504. If, however, a retransmission and reload are successful as determined at 502, then after optional backed-up configuration data is reloaded at 502 to write over the new configuration data loaded, error handler flow 500 may quit at 504. As previously described, backup configuration data may be loaded in temporary storage such as with use of BRAM of FPGA 100 or external storage 210. This information may be provided back to ICAP 205 for reloading.

In the example of FIG. 2, with use of storage 210 backup configuration data 216 may be requested by configuration controller 203 for providing to frame buffer 202 for loading into configuration memory of programmable logic via ICAP 205. After backup configuration data is reloaded, error handler 409 may quit at 504. Alternatively, error handler 409 may be omitted and partial reconfiguration flow may simply end at 499 if a frame is found to be invalid at 405. Alternatively, error handler 409 may just output an error signal at 503. However, is should be understood that one or more operations of operations 501 through 503 of error handler flow 500 may be omitted as part of error handler 409.

Figure 6:
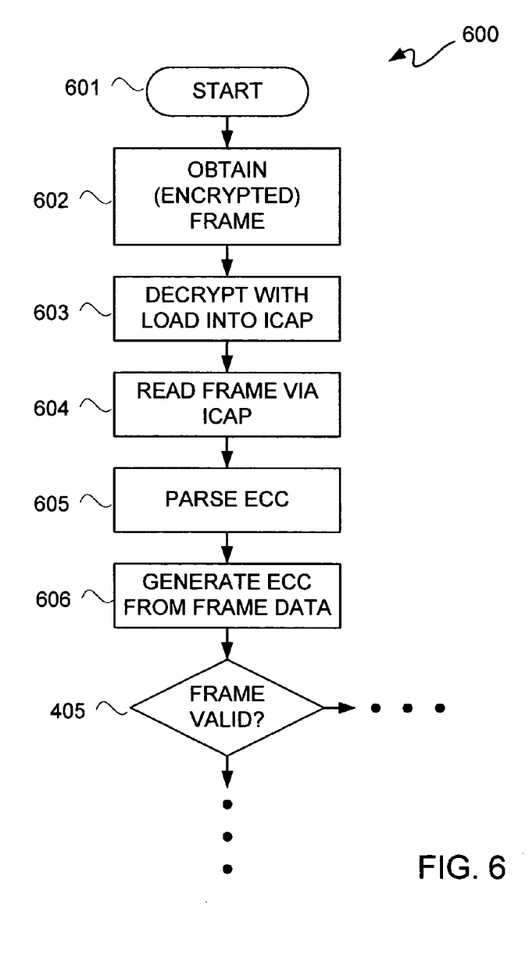
FIG. 6 is a flow diagram depicting an exemplary embodiment of an alternative partial reconfiguration flow.

FIG. 6 is a flow diagram depicting an exemplary embodiment of an alternative partial reconfiguration flow 600. Partial reconfiguration flow 600 is initiated at 601. At 602, a frame of configuration data is obtained by FPGA 100 of FIG. 2. Partial reconfiguration flow 600 is further described with simultaneous reference to FIGS. 2, 4, and 6.

The frame of configuration data obtained at 602 may be encrypted. At 603, the frame of configuration data obtained at 602 is loaded into configuration memory via ICAP 205. If such a frame of configuration data is encrypted, loading an encrypted frame of configuration data automatically invokes decryption module 206 which decrypts the encrypted frame of configuration data at 603.

At 604, the frame of configuration data is read via ICAP 205 and provided to error checker 204 for generating ECC bits. At 606, error checker 204 generates ECC bits from the frame data read via ICAP 205. At 605, the ECC bits included with the frame obtained at 602 are parsed, as previously described, by error checker 204. At 405, a comparison is made between the ECC bits generated by error checker 204 and the ECC bits parsed at 605 to determine whether or not the frame of configuration data is valid as previously described with reference to FIG. 4.

Accordingly, it should be appreciated that an FPGA may be conventionally configured with a first bitstream in a non-dynamic mode of operation. After such configuration, which may include a user design, the FPGA may be configured or partially reconfigured or a combination thereof with validation prior to such configuration or partial reconfiguration, or combination thereof, as described herein, while operating in a dynamic mode of operation. In other words, dynamic configuration or partial reconfiguration, or a combination thereof, may be done while still operating the FPGA which may include unaffected portions of a user design instantiated in such FPGA. Furthermore, if a packet for example indicates that configuration data in encrypted, frame buffer may optionally directly provide such encrypted configuration data to decryption module 206 for decryption prior to providing to ICAP 205. Decrypted configuration data may be provided to ICAP 205 from decryption module 206.

It should be appreciated that validation of configuration data obtained from partial bitstream source 201 may be done even after a configuration done pin (not shown) of FPGA 100 is set. A done pin of FPGA 100 is known, and thus is not described in unnecessary detail herein for purposes of clarity and not limitation. Furthermore, it should be appreciated that ECC bits are used not merely to correct configuration data but also as a check on the integrity of such data.

Figure 7:
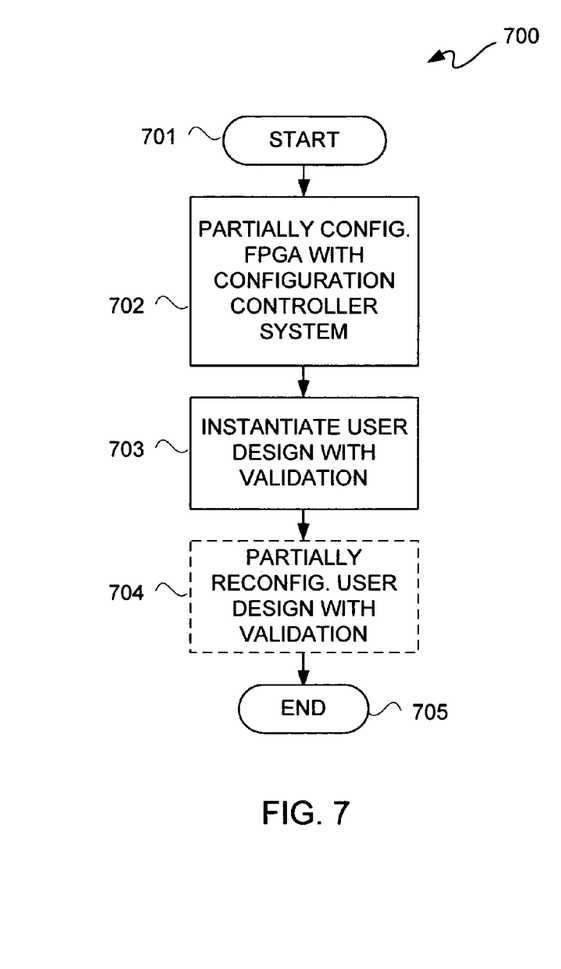
FIG. 7 is a flow diagram depicting an exemplary embodiment of a configuration flow.

FIG. 7 is a flow diagram depicting an exemplary embodiment of a configuration flow 700. Configuration flow 700 is initiated at 701. At 702, an FPGA, such as FPGA 100 of FIG. 2, is partially configured with a configuration controller system as described with reference to FIG. 2. More particularly, configuration controller system at 702 includes a configuration controller 203 coupled to a frame buffer 202 and an error checker 204 with an ICAP 205 coupled to frame buffer 202 and with one or more interfaces for reading in configuration information from external storage to FPGA 100. Of note, at 702 a user design need not be instantiated at all, hence it should be understood that FPGA may be effectively partially configured at 702. At 703, a user design is instantiated with validation as previously described with reference to instantiating a partial bitstream 212 in programmable logic of FPGA 100.

Thus, it should be appreciated that a user design 215 may be entirely instantiated at 703 in a dynamic configuration mode. In short, FPGA may be operating as partially configured at 702 and may continue to operate for receipt of a user design at 703. Optionally at 704, the user design instantiated at 703 may be partially reconfigured with validation prior to such reconfiguration as previously described for example with reference to FIGS. 2 and 4.

It has been assumed that FPGA 100 is to be partially configured with a partial configuration bitstream, such as partial configuration bitstream 211 at 702. However, it should be appreciated that the configuration controller system described with reference to FIG. 2 may be hardwired or embedded within FPGA 100. Thus, such partial configuration at 702 for example may be omitted in whole or in part depending on the amount of configuration controller system embedded in FPGA 100. However, embedding a configuration controller system as described herein in FPGA 100 may add cost to FPGA 100 which would not be borne equally with respect to those users not employing partial configuration or reconfiguration as described herein.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for programming programmable circuitry, the method comprising:
    configuring the programmable circuitry with a first bitstream in a non-dynamic mode of operation using an external configuration access port, wherein the configuring instantiates a configuration controller coupled to a buffer, an internal configuration access port, and an error checker in the programmable circuitry;
    loading a portion of a second bitstream into the buffer for a dynamic partial configuration mode of operation;
    validating the portion of the second bitstream loaded into the buffer with the error checker as being acceptable; and
    after the validating, instantiating the portion of the second bitstream in the programmable circuitry via the internal configuration access port.

2. The method according to claim 1, further comprising validating the first bitstream prior to the configuring of the programmable circuitry with the first bitstream.

3. The method according to claim 1, wherein the validating is performed with at least one error checking means selected for a group consisting of an error-correcting code and a cyclic redundancy check.

4. The method according to claim 1, further comprising:
    determining error-correcting code values for associated frames of data of the second bitstream; and
    storing the error-correcting code values in association with the frames of data for the validating.

5. The method according to claim 4, wherein the loading of the portion of the second bitstream includes loading a frame of data of the frames of data with associated first error-correcting code information of the error-correcting code values.

6. The method according to claim 5, wherein the validating includes:
    parsing the first error-correcting code information from the frame of data;
    generating second error-correcting code information with the error checker using the frame of data; and
    comparing the first error-correcting code information and the second error-correcting code information for a match thereof to validate frame of data loaded in the buffer as being acceptable.

7. A method for programming programmable circuitry, the method comprising:
    configuring the programmable circuitry with a first bitstream using an external configuration access port to instantiate a configuration controller coupled to a buffer, an internal configuration access port, and an error checker;

loading a portion of a second bitstream into the buffer;

validating the portion of the second bitstream loaded in the buffer with the error checker as being acceptable; and after the validating, instantiating the portion of the second bitstream in the programmable circuitry via the internal configuration access port.

8. The method according to claim 7, wherein the second bitstream is a configuration bitstream for a user design.

9. The method according to claim 8, wherein the portion of the second bitstream is a frame of configuration data.

10. The method according to claim 9, further comprising:

repeating the loading, the validating, and the instantiating for all remaining frames of configuration data of the second bitstream.

11. The method according to claim 10, further comprising:

loading a portion of a third bitstream into the buffer;

validating the portion of the third bitstream loaded in the buffer with the error checker as being acceptable; and after the validating, instantiating the portion of the third bitstream in the programmable circuitry via the internal configuration access port to reconfigure the user design with the portion of the third bitstream.

12. The method according to claim 11, wherein the programmable circuitry is of a Field Programmable Gate Array.

13. A method for programming programmable circuitry, the method comprising:

configuring the programmable circuitry with a first bitstream using an external configuration access port to instantiate a configuration controller coupled to a buffer, an internal configuration access port, and an error checker;

loading a first portion of a second bitstream into the buffer;

sending the first portion to a decryption module to decrypt the first portion;

decrypting the first portion with the decryption module to obtain first configuration information therefrom;

the first configuration information including at least first error detection information;

parsing first configuration data of the first configuration information from the first error detection information;

determining second error detection information from the first configuration data;

validating the first configuration data by comparing the first error detection information and the second error detection information; and responsive to the validating indicating the first configuration data is acceptable, instantiating the first configuration data in the programmable circuitry via the internal configuration access port.

14. The method according to claim 13, wherein the sending includes loading the first portion into the internal configuration access port to automatically invoke the decrypting with the decryption module.

15. The method according to claim 13, further comprising responsive to the validating indicating the first configuration data is not acceptable, invoking an error handling routine.

16. The method according to claim 15, further comprising:

the first configuration information further including first error correction information;

determining second error detection information from the first configuration data; and attempting to correct a single bit error by the error handling routine using the first error correction information and the second error detection information.

17. The method according to claim 16, wherein the error handling routine includes reloading the first portion of the second bitstream into the buffer.

18. The method according to claim 13, further comprising prior to the instantiating of the first configuration data in the programmable circuitry via the internal configuration access port, storing second configuration data already instantiated in the programmable circuitry which is to be replaced by the first configuration data.

19. The method according to claim 18, further comprising:

loading a second portion of the second bitstream into the buffer;

sending the second portion to the decryption module to decrypt the second portion;

decrypting the second portion with the decryption module to obtain second configuration information therefrom;

the second configuration information including third error detection information;

parsing third configuration data of the second configuration information from the third error detection information;

determining fourth error detection information from the third configuration data;

validating the third configuration data by comparing the third error detection information and the fourth error detection information; and responsive to the validating indicating the third configuration data is not acceptable for the instantiating thereof in the programmable circuitry, invoking an error handling routine.

20. The method according to claim 19, wherein the error handling routine includes re-instantiating the second configuration data to replace the first configuration data already instantiated in the programmable circuitry responsive to the third configuration data not being acceptable for the instantiating thereof in the programmable circuitry.

* * * * *